July 17, 1962      E. S. TUPPER      3,044,659
VESSELS AND HANDLES THEREFOR

Filed July 30, 1959      2 Sheets-Sheet 1

INVENTOR.
EARL S. TUPPER

BY

ATTORNEY.

July 17, 1962     E. S. TUPPER     3,044,659
VESSELS AND HANDLES THEREFOR
Filed July 30, 1959     2 Sheets-Sheet 2

INVENTOR.
EARL S. TUPPER
BY
ATTORNEY.

United States Patent Office 3,044,659
Patented July 17, 1962

3,044,659
VESSELS AND HANDLES THEREFOR
Earl S. Tupper, Esmond, R.I., assignor to Rexall Drug and Chemical Company, Los Angeles, Calif., a corporation of Delaware
Filed July 30, 1959, Ser. No. 830,663
7 Claims. (Cl. 220—94)

This invention relates generally to portable receptacles, containers or casings having detachable snap-in bails or handles articulately or flexibly mounted thereon, but more specifically to the joint structure between the bail and vessel.

A main object of the invention resides in the provision of a simple snap-in type of joint structure between handle bails and said vessels in loaded or unloaded condition for lifting and carrying purposes, the bail element being articulately joined for flexible or free movement and being removable.

A further object of the invention resides in the provision of a resilient and plastic bail member capable of assuming a flexed position when in snapped-in engagement with the vessel and maintaining articulate connection therewith when in loaded or unloaded condition for lifting and carrying purposes.

A further object of the invention resides in the provision of a mounting structure on the vessel having resilient and cooperating receiving means for snap-in, removable and articulating engagement with the corresponding bail elements.

A further object of the invention resides in the provision of a novel type of detachable articulately connecting means between male and female members wherein at least one of said members is of resiliently yieldable plastic.

A further object of the invention resides in the provision of a manually assembleable and disassembleable joint involving a removable handle element for lifting and carrying industrial, commercial household and other equipment and wherein the joint elements are strong, durable, efficient, economical to manufacture and easy to assemble and disassemble.

These objects and other incidental ends and advantages of the invention will hereinafter appear in the progress of the disclosure and as pointed out in the appended claims.

Accompanying this specification are drawings showing a form of the invention wherein.

In accordance with the invention and the preferred form shown, numeral 10 indicates a vessel of any type having a chamber formed by a bottom wall 11 and a peripheral side wall 12. As shown, the bottom wall 11 is provided with a downwardly extending peripheral edge portion 11a to elevate bottom wall 11 for the usual reasons.

Figure 3:
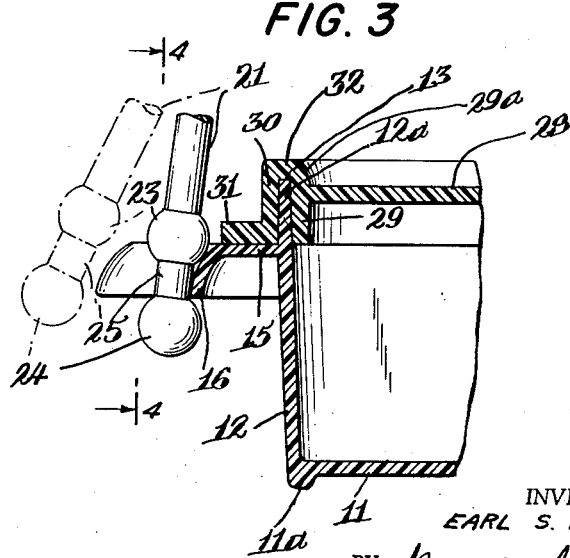
FIGURE 3 is a sectional view of FIGURE 1 across the plane 3—3 thereof illustrating a snap-in type of engagement between a portion of the bail member and the mounting portion therefor on the vessel.

The upper rim portion of side wall 12 may be offset if desired as at 12a as when said wall tapers outwardly from the bottom as best seeen in FIGURE 3. The free edge of said rim portion is indicated as at numeral 13.

Associated with and forming part of the vessel are mounting means for the demountable bail or handle and consists essentially of one or more accessible and compound-notched members for articulate and demountable snap-in engagement with the handle or bail end portions.

The mounting means as shown are in a pair, each being provided at spaced parts of the vessel, but it is understood that a single mount may be used and provided with a plurality of compound notches as will be described along opposite edges for engagement of corresponding ends of the handle or bail.

Thus and as shown, vessel 10 has a pair of spaced extensions each generally indicated by numeral 14 for bail end engagement. Each extension consists of an outwardly or horizontally extending flange 15 disposed below rim edge 13 and provided with a downwardly extending skirt portion 16. The flange 15 is provided with one or more compound notches each having a bearing aperture 17 for loose mounting of bail neck 25, and a communicating restricted mouth 18 leading thereto from the outer edge of flange 15. Mouth 18 is of smaller dimensions than neck 25 while aperture 17 is of larger dimensions; and by providing resiliency between neck 25 and mouth 18, a snap-in and loose-fit type of joint is effected.

Neck 25 is disposed at the end portions of a handle generally designated by numeral 19 and is provided with a pair of spaced and opposite heads 23 and 24 which are of larger dimensions than aperture 17 and provide limits for axial and other movements of the loose fitting neck 25. Thus, neck 25 between the spaced heads 23 and 25 is insertable by a snap-in and manual type of operation through the yieldable and resilient mouth 18 of flange 15 and is maintained as an articulating joint part by heads 23 and 24 serving as limits for axial movement. For lifting and carrying purposes, the lower head 24 bearing against the underside of flange 15 at aperture 17 and restricted mouth 18 sustains the load of the vessel 10. The upper head 23 serves as a stop for downward movement of neck 25.

Figure 4:
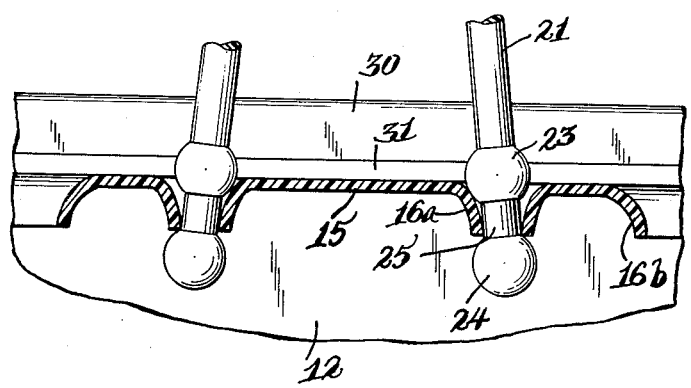
FIGURE 4 is an enlarged sectional view of FIGURE 3 across the plane 4—4 thereof.
Figure 2:
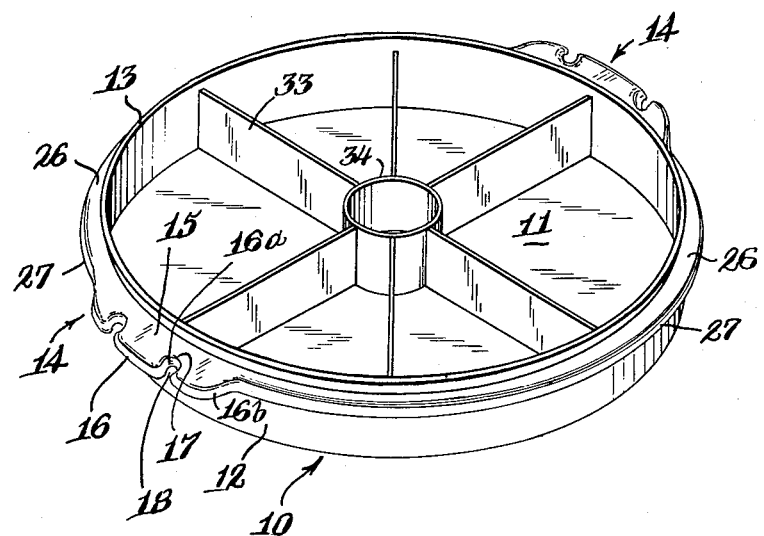
FIGURE 2 is a view in perspective of FIGURE 1 with both bail member and cover or closure removed to indicate a form of specific vessel chamber such as a Lazy Susan tray.

Flange 15 as shown has a downwardly extending skirt 16 which continues along the flange edge into the compound notch as indicated by 16a and also continues as at 16b for junction with a skirt 27 of the vessel flange 26. In the embodiment shown, lower head 24 engages the lower edge of skirt 16a when the bail supports the vessel as best seen in FIGURE 4.

The bail member, generally indicated by numeral 19 and as shown consists of a pair of resiliently yieldable and spaced rods 20 and 21 joined by transverse pieces 22 to form a lattice type of handle. Each of the rods as shown is provided with a neck 25 and heads 23 and 24 for engagement with corresponding compound notches in each of the extensions 14.

Figure 1:
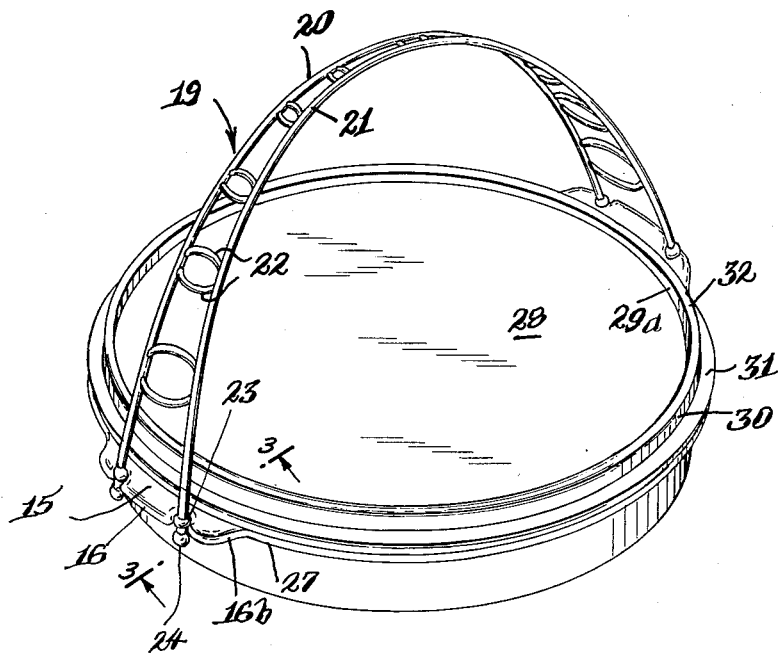
FIGURE 1 is a view in perspective showing a vessel for illustrative purposes and optionally having a removable and sealable closure thereon, the vessel being provided with mounting members for snap-in and demountable engagement with bail member elements.

Bail member 19 when removed from the vessel may assume a flat position and when in articulated engagement therewith is flexed as shown in FIGURE 1. Such flexing is inherent in the bail material when formed of a resilient and yieldable plastic material. Of course, a deformable plastic such as a polyolefin or a vinyl is protective to the hands when the bail is held under load.

Vessel 10 as shown is provided with a flange 26 continuous with and on each side of flanges 15 of extensions 14, said flanges being spaced below vessel edge 13. Flanges 26 are also provided with skirts 27 continuous with skirts 16b of the extensions.

Vessel 10 as shown may be provided with a closure engageable with vessel rim 12a and vessel flanges 15 and 26. Thus, the closure shown is comprised of a central wall 28 and an upwardly offset and inverted rim groove having an inner wall 29, outer wall 30, an outer wall extension 31 and a top connecting wall 32. The inner wall portion of the groove extending above central wall 28 is indicated at 29a as shown in FIGURE 3.

The closure shown is adapted for air and fluid-tight sealability; and the positioning of ears 14 and the compound notches thereof permit clearance of bail 19 over the top of vessel 10 whether covered or not.

The joint operative parts of bail 19 and the compound notch parts of extensions 14 are operative to form a demountable and articulating joint when all of said parts are formed of a yieldable and resilient plastic including the polyolefins such as polyethylene or polypropylene as well as other soft, resilient and yieldable plastics. However, the invention is operable when only one of said parts are of plastic yieldable and resilient materials.

Details of vessel 10 construction permit same to be formed of a yieldable and soft and resilient plastic material such as high-pressure polyethylene by reason of the rigidifying effects of the flanges 15—26 and the skirts 16a—16b and 27. In addition, a segmenting element adds to such rigidification and reinforcement such as radial fingers 33 extending from a central hub 34. The segmenting element may be removable or joined to the vessel walls 11 and 12. Moreover, the ears or extensions 14 and the flange or skirt 26 and 27 serve as selective and continuous hand grasping means for the vessel.

The structures described may be integrally formed by any suitable type of molding including injection and vacuum molding or may be the result of fabrication.

It is understood that minor changes and variations in design, shape, integration and sizes of parts, materials and methods of manufacture may all be resorted to without departing from the spirit of the invention and the scope of the appended claims.

I claim:

1. In a coverable dispensing tray carrying a demountable bail member, the combination of a base member, a peripheral wall extending therefrom to form an open-mouthed chamber therewith, a pair of mounting ears extending from said peripheral wall and each having a notch and notch throat leading thereto, a bail member of resiliently yieldable plastic and having at each end a pair of spaced stop heads and a connecting neck therebetween in penetrating engagement with corresponding notches in said ears, said bail member being in flexed position for maintaining said engagement normally fixed, said bail member being forceably insertable and demountable at the said necks through the corresponding notch throats.

2. In a coverable dispensing tray carrying a demountable bail member, the combination of claim 1 wherein said base member, said peripheral wall and said ears are formed of resiliently yieldable plastic, and having means for simultaneously rigidifying and dividing the chamber into separate compartments.

3. The combination of a vessel having a side wall and a demountable bail member, including a pair of opposite mounting ears affixed to the vessel side wall, each of said mounting ears having at least a notch and a notch throat leading thereto, and a bail member having at each end a pair of spaced stop heads and a connecting neck portion integrally secured thereto and therebetween and in penetrating and normally tight engagement with corresponding notches in said ears, said bail member being forceably insertable and demountable at the said necks for said engagement with the notches through the corresponding notch throats, at least one of the said engaging parts being formed of resiliently yieldable plastic.

4. The combination of claim 3 wherein both the bail member and said ears of the vessel are formed of resiliently yieldable plastic.

5. In an articulate and removable joint between a handle end and a container, the combination of a container ear having a notch opening with side walls tapering downwardly and inwardly, said notch opening having a restricted throat leading thereto, a handle end portion having a pair of spaced and enlarged stop heads of larger dimension than said notch opening and integrally secured to a neck part afforded by said handle end, said neck part being of larger dimension than said throat and at least of equal dimension with the base of the said side walls of the notch opening, said neck part being in penetrating and tight and articulable engagement with said notch walls, said handle end being forceably inserted and demountable in and from the notch walls at the said neck part through the notch throat, at least one of the handle end and notch wall parts being resilient.

6. In an articulate and removable joint, the combination of claim 5 wherein at least one of the handle end and notch wall parts are of yieldable and resilient plastic.

7. An articulate and removable joint between a flexed and resilient and yieldable plastic handle and a container, comprising a pair of resilient container ears each having a notch opening with downward and inwardly tapering side walls and a restricted throat therefor communicating therewith, handle end portions for said ears each having a neck part of larger dimensions than said throat and at least of equal dimensions with the base of the walls of said notch opening, said neck part having spaced and enlarged stop heads affixed thereto and of larger diameter than the notch opening, said neck part being in normally tight and penetrating engagement with the notch side walls and being insertable and demountable therein and therefrom through the notch throat, the stop heads serving to limit axial and other movements of said neck in the notch walls.

References Cited in the file of this patent

UNITED STATES PATENTS

| | | |
|---|---|---|
| 974,567 | Harrigan | Nov. 1, 1910 |
| 1,093,282 | McCall | Apr. 14, 1914 |
| 1,465,759 | Dey | Aug. 21, 1923 |
| 1,682,048 | Levien | Aug. 28, 1928 |
| 1,694,165 | Debacher | Dec. 4, 1928 |
| 2,579,689 | Miller | Dec. 25, 1951 |